United States Patent
Walser

(10) Patent No.: US 11,267,282 B2
(45) Date of Patent: Mar. 8, 2022

(54) ANNULAR WHEEL-TRIM FOR VEHICLE FLOATING-SEAT RIM FLANGE, AND ASSEMBLY MADE UP OF AN ANNULAR WHEEL-TRIM AND OF AN ADAPTER FOR A FLOATING-SEAT WHEEL

(71) Applicant: COMPAGNIE GENERALE DES ETABLISSEMENTS MICHELIN, Clermont-Ferrand (FR)

(72) Inventor: Daniel Walser, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 410 days.

(21) Appl. No.: 16/316,218

(22) PCT Filed: Jul. 4, 2017

(86) PCT No.: PCT/FR2017/051817
§ 371 (c)(1),
(2) Date: Jan. 8, 2019

(87) PCT Pub. No.: WO2018/007751
PCT Pub. Date: Jan. 11, 2018

(65) Prior Publication Data
US 2019/0299705 A1    Oct. 3, 2019

(30) Foreign Application Priority Data
Jul. 8, 2016 (FR) ...................................... 1656594

(51) Int. Cl.
*B60B 7/01*    (2006.01)
*B60B 7/06*    (2006.01)
(Continued)

(52) U.S. Cl.
CPC ................ *B60B 7/01* (2013.01); *B60B 7/063* (2013.01); *B60B 7/08* (2013.01); *B60C 15/0209* (2013.01); *B60B 2900/572* (2013.01)

(58) Field of Classification Search
CPC .... B60B 7/01; B60B 7/02; B60B 7/06; B60B 7/063; B60B 7/08; B60B 7/12;
(Continued)

(56) References Cited

U.S. PATENT DOCUMENTS 1,858,228 A * 5/1932 Lyon .......................... B60B 7/01
152/406
6,626,217 B2 * 9/2003 Bestgen .............. B60C 15/0203
152/379.4
(Continued)

FOREIGN PATENT DOCUMENTS

DE    4432132 A1 *  3/1996    ............... B60B 7/01
JP    8-216602 A    8/1996
(Continued)

OTHER PUBLICATIONS

International Search Report dated Sep. 26, 2017, in corresponding PCT/FR2017/051817 (6 pages).

*Primary Examiner* — S. Joseph Morano
*Assistant Examiner* — Emily G Castonguay
(74) *Attorney, Agent, or Firm* — Venable LLP

(57) ABSTRACT

An annular wheel-trim 1 for a wheel 2 that has a floating tyre seat 2, comprising rim lateral parts 251, each rim lateral part comprising a tyre seat 253 extended axially outwards by a flange 254, comprises fixing elements able to provide removable attachment to the flange 254.

9 Claims, 4 Drawing Sheets

(51) Int. Cl.
*B60B 7/08* (2006.01)
*B60C 15/02* (2006.01)

(58) Field of Classification Search
CPC ....... B60B 21/12; B60B 21/125; B60B 25/18; B60B 25/22; B60C 15/0203; B60C 15/0206; B60C 15/0209; B60C 15/16
See application file for complete search history.

(56) References Cited

U.S. PATENT DOCUMENTS

| | | | |
|---|---|---|---|
| 6,779,852 B2 * | 8/2004 | Van Houten | B60B 7/0013 301/37.106 |
| 2004/0021367 A1 * | 2/2004 | Rumi | B60B 7/12 301/95.101 |
| 2017/0291457 A1 | 10/2017 | Topin et al. | |

FOREIGN PATENT DOCUMENTS

| | | | | |
|---|---|---|---|---|
| KR | 20140005829 U | * | 11/2014 | ............... B60B 7/01 |
| WO | 93/07012 A2 | | 4/1993 | |
| WO | 33/106193 A1 | | 12/2003 | |
| WO | 2016/046197 A1 | | 3/2016 | |

* cited by examiner

Coupe V-V

ANNULAR WHEEL-TRIM FOR VEHICLE FLOATING-SEAT RIM FLANGE, AND ASSEMBLY MADE UP OF AN ANNULAR WHEEL-TRIM AND OF AN ADAPTER FOR A FLOATING-SEAT WHEEL

FIELD OF THE INVENTION

The subject of the invention is an annular wheel-trim for the flange of a wheel of which the seat intended to accept the tyre bead is radially floating and extended by a flange.

A tyre, a rim, an extender, an annular wheel-trim, which are products discussed in the present invention, are objects which are usually described by a representation in a meridian plane, namely a plane containing an axis of rotation, the axis of rotation of the tyre. The radial and axial directions respectively denote the directions perpendicular to the axis of rotation of the tyre and parallel to the axis of rotation of the tyre. In what follows, the expressions "radially" and "axially" respectively mean "in a radial direction", and "in the axial direction". The expressions "radially on the inside" or, respectively, "radially on the outside" mean "closer to" or, respectively, "further away from, the axis of rotation of the tyre, in a radial direction". A meridian plane is a plane perpendicular to the axis of revolution of the tyre, positioned axially in such a way as to intersect the surface of the tread substantially mid-way between the beads. The expressions "axially on the inside or, respectively, axially on the outside" mean "closer to or, respectively, further away from, the median plane of the tyre, in the axial direction". A meridian cross section is a section on a plane which contains the axis of rotation.

PRIOR ART

In general, a tyre comprises a tread, intended to come into contact with the ground, two sidewalls extending the axial ends of the tread radially inwards, and two beads extending the two sidewalls radially inwards and intended to come into contact with a rim.

Document WO2016/046197 proposes inserting an elastic extender between a tyre bead and a rim. The reader may for example refer to FIG. 5 of that document in order to acquaint himself with a rolling assembly belonging to the field of the invention. Therein he will see a rolling assembly comprising a tyre, a rim and two identical extenders. Considering the language conventions recalled hereinabove, and with reference to the way in which such an extender is mounted on a rim, such an extender comprises, axially from the inside towards the outside, an axially inner end intended to secure the extender to the rim. Such an extender also comprises an axially outer end intended to receive a tyre bead. A flexible body connects the two, respectively axially inner and axially outer, ends. Such a wheel has a floating seat. It comprises a rim of which the axial ends, where the tyre seats are situated, can move radially in the event of a very high stress loading by a force oriented radially towards the axis of rotation of the wheel. To give a concrete example, let it be pointed out that a seat is considered to be "floating" if, when the mounted assembly is compressed on flat ground, the deflection of the wheel is greater than 2.5 mm/T and preferably greater than 3.2 mm/T.

The benefit of mounting a tyre on a wheel with a floating seat is that it makes the tyre less sensitive to a violent impact such as a knock against a kerb for example That allows the tyre bead a greater amount of movement associated with the travel permitted by the floating seat. It will be readily appreciated that the greater the travel offered to the tyre, the less sensitive it will be to the impact. And especially when the space able to accommodate this travel is great. The rigid part of the wheel must therefore not impede this travel.

In the industrial field of wheels and the wheel trims/hubcaps thereof, a wheel trim or hubcap covers all or part of the wheel disc in order to improve the appearance thereof. Sometimes the wheel trim covers only the rim flange, in other words the hooked edge of the rim, as illustrated in documents JPH08-216602A, JPH08-188002A and WO93-07012. Sometimes also, the wheel trim partially covers the tyre, as illustrated in document WO03-106193.

Coming back to the category of floating-seat wheels, it is necessary for the volume under the end of the rim, under the seat, not to comprise any obstacle that functionally opposes the desired deformations when such a floating-seat wheel is being used. What that means to say is that a functional void needs to be created. Now, this functional void creates a design constraint as the eye is drawn to the metal part of the wheel which contrasts with the extender and the tyre, which are made of rubber, and therefore black in colour. The consequences of the presence of extenders do not follow the current trend in wheel design. Specifically, the current trend is to have, visually, a wheel which is as large as possible, and sometimes also to have "full face" wheels, which means to say wheels that exhibit no visual discontinuity onto the rim flanges but rather exhibit an almost flat surface between the sidewall of the tyre and the wheel disc.

There then arises the problem of finding the technical means of achieving a visual perception of a large-diameter wheel, extending as far as the tyre bead.

BRIEF DESCRIPTION OF THE INVENTION

The invention therefore relates to an annular wheel-trim for a wheel that has a floating tyre seat, the said wheel having an axis of rotation, the said wheel comprising a rim which comprises rim lateral parts, each rim lateral part comprising a tyre seat extended axially outwards by a flange, at least one of the tyre seats being a floating seat and the flange axially extending the said floating seat being a floating flange, having a shape of revolution generated by a central section comprising a portion of substantially radial mean orientation, comprising fixing elements able to provide removable attachment to the flange, characterized in that the annular wheel-trim has a capacity for elastic deformation that allows it, when subjected, over an arc with a curvilinear length of 430 mm, to deform, moving the said central section axially by 2 mm, while at the same time causing it to depart from the radial orientation by an angle α of 5°, and revert to its initial shape without permanent deformation.

So, although an elastic extender inserted between a tyre bead and a rigid wheel is generally produced on the basis of reinforced elastomer material (like the tyres), generally black in colour, by adding an annular wheel-trim, the invention makes it possible to harmonize the appearance of the annular wheel-trim with the appearance of the wheel disc, for example by harmonizing the colours thereof, for example by choosing them to be identical, thereby making it possible to create a finished item (floating-seat wheel) the appearance of which is just as pleasing as that of rigid wheels, notably light alloy wheels which have become very popular for passenger vehicles.

The floating-seat wheel, in its rigid part, may be produced in any of the ways that are suitable for a conventional wheel, namely for a wheel that is completely rigid in the face of the service stress loadings, such as, for example, in pressed sheet, light alloy, composite material, or a combination of any of the technologies listed above. The mounting bearing surface allows the wheel to be mounted on a hub directly, or by means of intermediate components (these too being rigid). The bearing surface for attachment to a hub is on the axially interior side of the wheel, the wheel-trim being mounted on the axially exterior side.

Furthermore, in an advantageous alternative form of embodiment, better visual continuity between the annular wheel-trim and the wheel is ensured by using such an annular wheel-trim in combination with a deformable hubcap having a central edge fixed to the wheel disc and having an exterior periphery positioned just below the flange and connected to the central edge by an intermediate sector that is deformable so that the exterior periphery can be moved radially inwards with respect to the central edge. Use is therefore made of a wheel-trim which is itself flexible so that it can deform to a certain extent (the sizing can calculate a permissible deformation threshold) dependent on the amount of float of the rim seat on the wheel.

DESCRIPTION OF THE FIGURES

The invention is described hereinafter with the aid of FIGS. 1 to 7, among which.

DETAILED DESCRIPTION OF THE INVENTION

Figure 1:
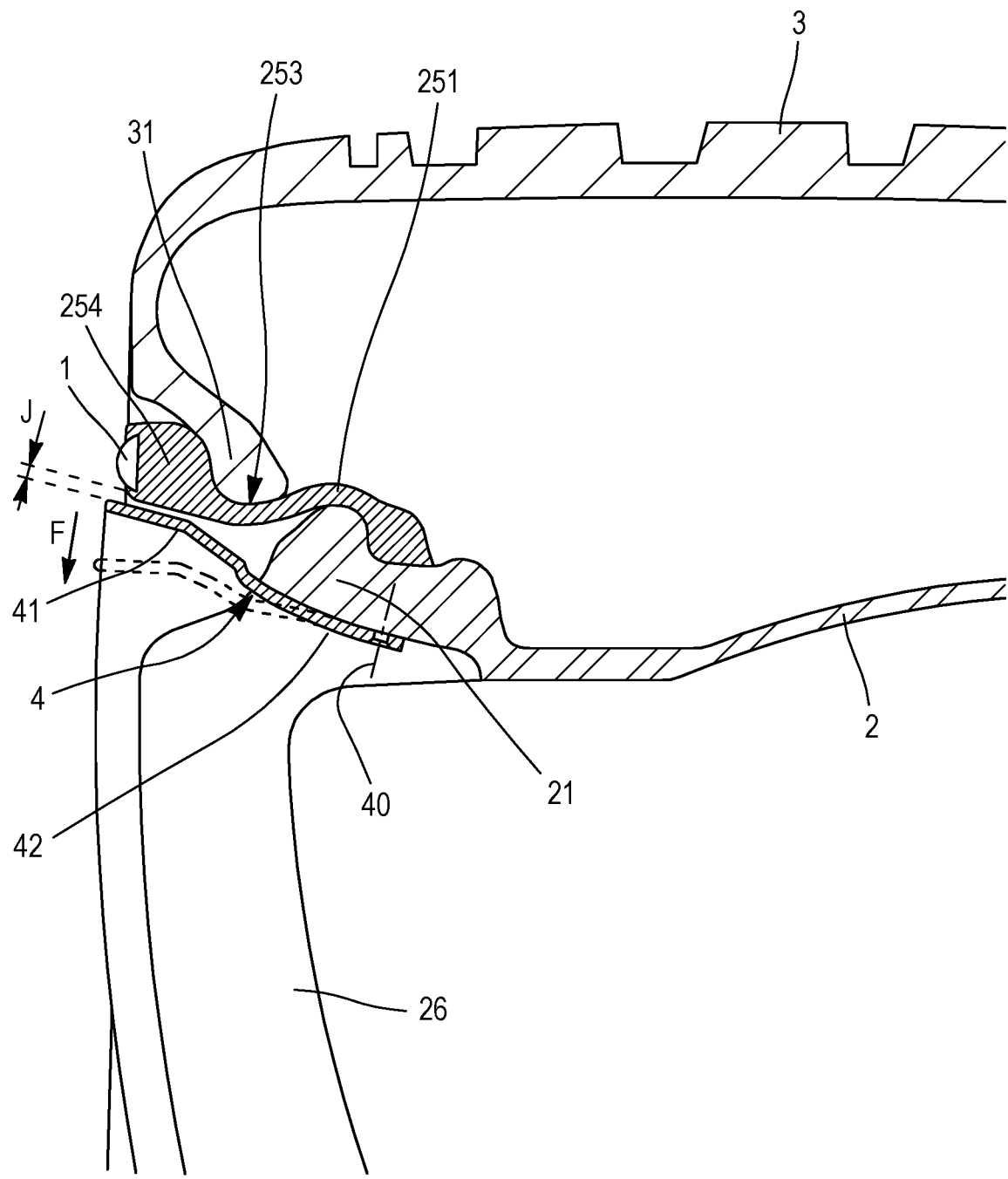
FIG. 1 is a partial meridian section through an assembly of a tyre mounted on a floating-rim wheel and an annular wheel-trim according to the invention.

FIG. 1 shows an annular wheel-trim 1, a floating-seat wheel 2, a tyre 3 and a hubcap 4. The floating-seat wheel 2 is formed by the assembly of a rigid wheel base 21, generally made in one piece, and two rim lateral parts 251, both flexible. Each rim lateral part comprises a tyre seat 253 extended axially outwards by a flange 254. The tyre 3 comprises two beads 31 each one mounted on one of the said tyre seats 253. In this embodiment, each of the rim lateral parts readopts identical teaching to the extender in document WO2016/046197; each rim lateral part is made of reinforced elastomer that allows it to move F in a radial direction of the flange 254 with respect to the opposite end of the said rim lateral part.

As an alternative, the floating-seat wheel may also comprise flexible rim lateral parts mounted in various ways, such as, for example, according to one or another of the examples given in document WO2015/086662, in all aspects equivalent as far as the present invention is concerned which is applicable provided that the wheel comprises floating seats, whatever the embodiment of the flexible part of the wheel, provided that it ends in a flange 254 against which the tyre bead 31 presses axially.

Figure 4:
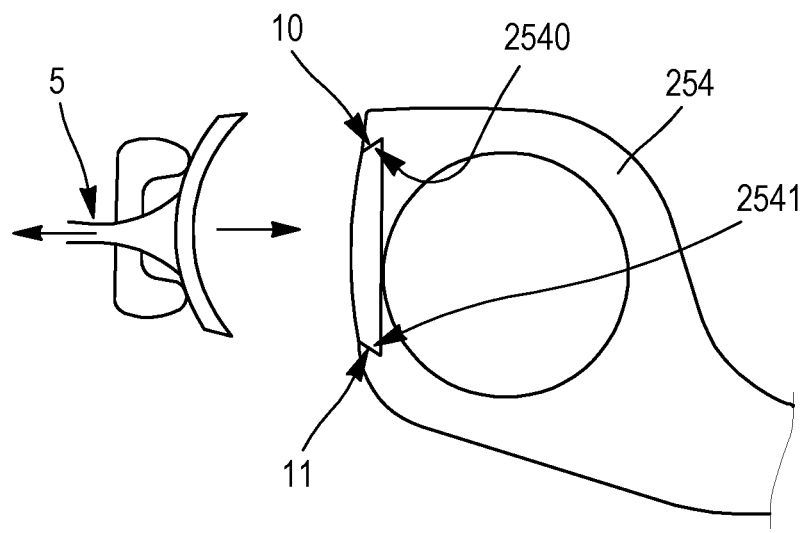

Let us return to the annular wheel-trim 1 depicted in FIGS. 1 and 4. Of the alternative forms of embodiment described hereinafter, the annular wheel-trim 1 of FIG. 1 is the one depicted in FIG. 4 to which the reader is also invited to refer. The annular wheel-trim 1 comprises radially exterior 10 and interior 11 faces, each of these faces being inclined axially outwards. The flange 254 comprises radially exterior 2540 and interior 2541 faces (see FIG. 4), each of these faces being inclined axially inwards, so as to collaborate in order to allow the removable mounting of the annular wheel-trim 1 on the flange 254. For preference, the annular wheel-trim 1 is configured in such a way as to be flexible in the face of the service stress loadings. Specifically, when the tyre strikes a significant obstacle, such as a pothole, it forces the flange 254 to move. If the annular wheel-trim 1 is to survive such a stress loading which under normal circumstances would be exceptional, the deformation must not extend beyond the elastic. In order to mount the annular wheel-trim 1 on the flange 254, use may, for example, be made of a tool 5 (see FIG. 4) that allows it to be pre-deformed by vacuum action. Thus, the annular wheel-trim 1 comprises fixing elements which collaborate with the axially exterior wall of the said flange. The connection between the annular wheel-trim 1 and the flange 254 is provided by axially undercut surfaces (10, 11 and 2540, 2541).

FIG. 1 also shows a hubcap 4 having an exterior periphery 41 which has a shape of revolution which, in the mounted position, is almost parallel to the rim lateral part 251 radially interior face axially on the outside, facing the flange 254. The hubcap 4 has a central periphery 42 conforming to the radially interior face of the axially exterior edge 21 on which a seat is formed for mounting the flexible lateral part 251 of the wheel 2. The hubcap 4 is intended to be attached using screws 40. Let it be noted that the wheel 2 comprises spokes 26 and that the central periphery 42 comprises cutouts leaving the space required for the spokes 26. The exterior periphery 41 is designed to collaborate with functional clearance J with respect to the said flange 2541. In the event of a high stress loading F that causes the exterior periphery 41 to move radially, the hubcap 4, constructed so as to be sufficiently deformable, adopts the appearance depicted in broken line. The advantage with this arrangement is that it provides better visual continuity. Thus, the invention also extends to an assembly formed by such an annular wheel-trim and an extender for a wheel with a floating seat, making it possible to convert a conventional fully rigid wheel into a floating-rim wheel, the extender forming a rim lateral part and comprising a tyre seat extended axially outwards by a flange.

Figure 2:
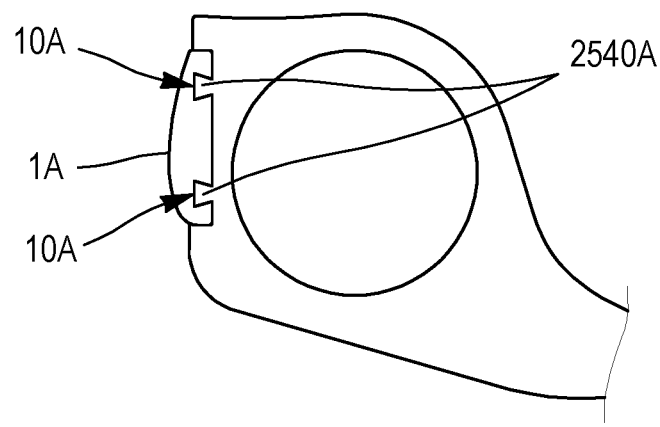
FIGS. 2 to 7 are radial sections showing various alternative forms of embodiment of an annular wheel-trim according to the invention.
Figure 3:
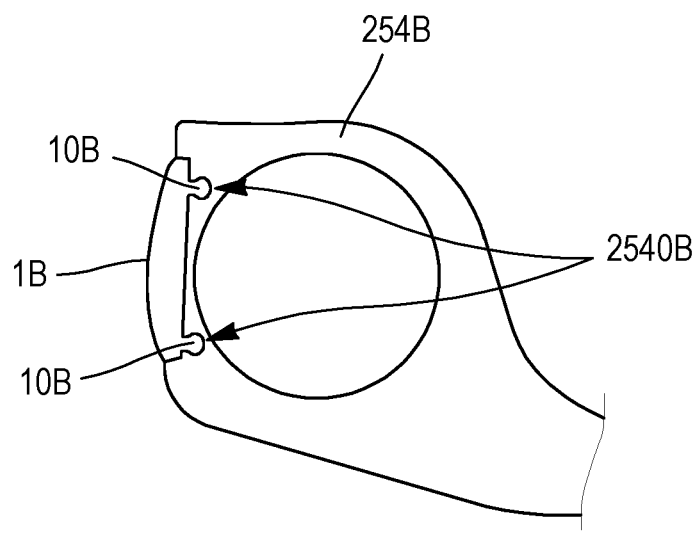
Figure 5:
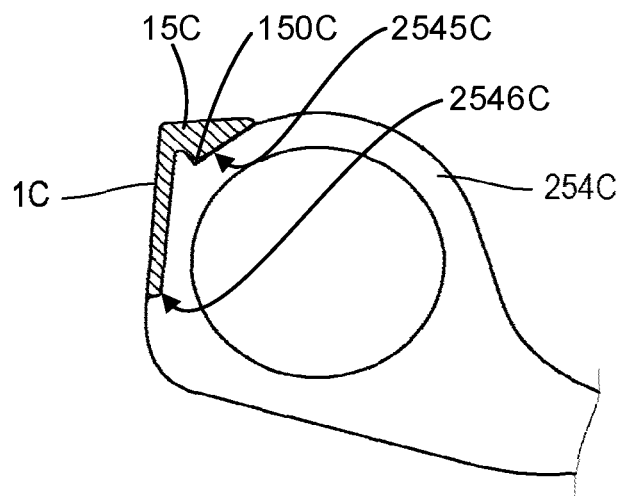

FIGS. 2, 3, 5 et seq show various alternative forms of embodiment of the annular wheel-trim according to the invention. They show only the annular wheel-trim and the flange on which it is mounted.

FIG. 2 shows an annular wheel-trim 1A comprising two circumferential grooves 10A formed on the axially interior face of the annular wheel-trim 1A. A flange 254A comprising two circumferential protrusions 2540A formed on the axially exterior face of the flange 254A can be seen. The said grooves 10A and protrusions 2540A form complementary dovetails, when viewed in meridian section, able to collaborate with one another to provide the removable mounting of the annular wheel-trim 1A on the flange 254A.

FIG. 3 shows an annular wheel-trim 1B comprising two circumferential protrusions 10B formed on the axially interior face of the annular wheel-trim 1B. A flange 254B comprising two circumferential grooves 2540B formed on the axially exterior face of the flange 254B can be seen. The said grooves 2540B and protrusions 10B are of complementary circular shapes, when viewed in meridian section, able to collaborate with one another to provide the removable mounting of the annular wheel-trim 1B on the flange 254B.

FIG. 5 shows an annular wheel-trim 1C of inverted L-shape when viewed in meridian section. It comprises a radially exterior branch 15C oriented axially, comprising a rib 150C forming a radially inwards protrusion. The flange 254C comprises a slot 2545C formed on its radially exterior surface and a slot 2546C formed on its radially interior surface. The said slots and ribs collaborate with one another to provide the removable mounting of the annular wheel-trim 1C on the flange 254C. Remember that the annular wheel-trim 1C is a component exhibiting symmetry of revolution, just like the flange 254C, which means that this arrangement ensures positive immobilization of the annular wheel-trim 1C on the flange 254C, in normal use, namely outside of instances of violent impacts such as running over potholes.

Figure 6:
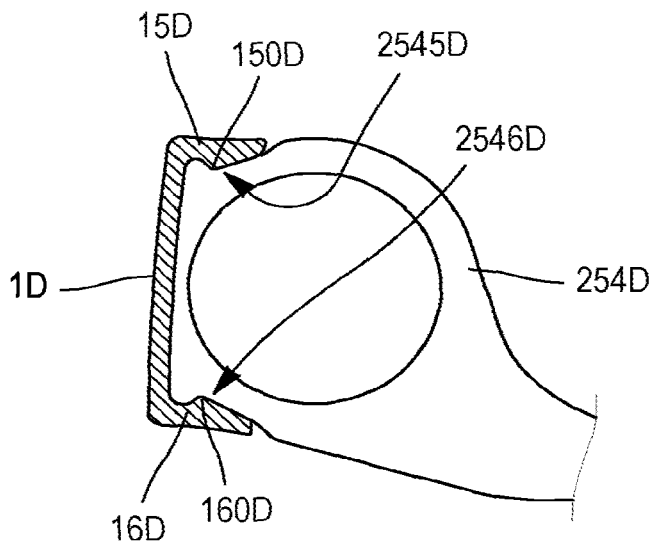

FIG. 6 shows an annular wheel-trim 1D which is C-shaped when viewed in meridian section. It comprises an axially-oriented radially exterior branch 15D and an axially-oriented radially interior branch 16D. The said radially exterior branch 15D comprises a rib 150D acting as a radially inwards protrusion and the said radially interior branch 16D comprises a rib 160D acting as a radially outwards protrusion. The flange 254D comprises a slot 2545D formed on its radially exterior surface and a slot 2546D formed on its radially interior surface. The said slots and ribs collaborate with one another to provide the removable mounting of the annular wheel-trim 1D on the flange 254D. This alternative form, in addition to yielding a different aesthetic effect, provides a more robust mounting of the annular wheel-trim. Various alternative forms can easily be designed, as the designers dictate: for example, the radially interior branch may be extended axially inwards, to fill the characteristic space of rolling assemblies comprising an extender.

Figure 7:
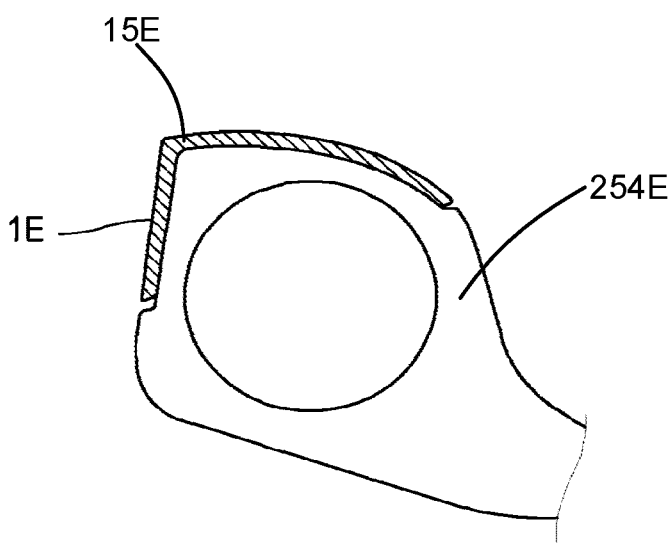

FIG. 7 shows an annular wheel-trim 1E of inverted L-shape when viewed in meridian section. It comprises an axially-oriented radially exterior branch 15E, forming an arc of a circle, viewed in meridian section, of a shape that complements the outline of the flange 254E. Remember that the annular wheel-trim 1E is a component exhibiting symmetry of revolution, just like the flange 254E, which means that this arrangement ensures positive immobilization of the annular wheel-trim 1D on the flange 254E.

Figure 8:
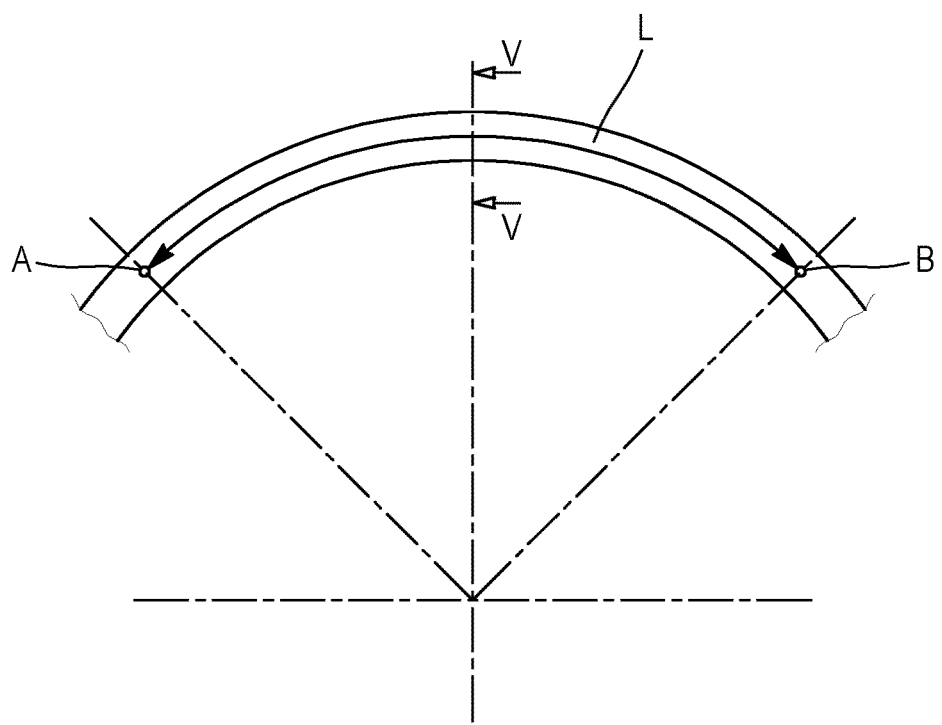
FIG. 8 is a schematic meridian section through an annular wheel-trim according to the invention.
Figure 9:
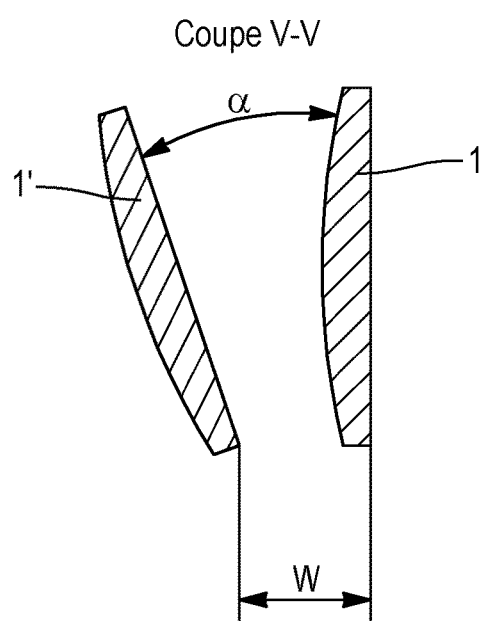
FIG. 9 is a section on V-V of FIG. 8.

Let us explain a test to which an annular wheel-trim can be subjected in order to check whether it has enough capacity for elastic deformation to accommodate the deformations of the extender in order to remain correctly in place during day-to-day use. FIG. 8 is a partial view of the annular wheel-trim 1, immobilized on a flat test table via its sections A and B. The sections are unable to move at all during the test. Given that the annular wheel-trim 1 experiences deformations when the tyre is in the contact patch, the test is performed on an arc of the annular wheel-trim 1, the curvilinear length L of which has been fixed experimentally at 430 mm, noting that this value is sufficiently independent of the dimensions of the annular wheel-trim 1 for the purposes of the test. FIG. 9 depicts the annular wheel-trim 1 without deformation, and shows the shape that this annular wheel-trim of FIG. 8 adopts when subjected, by means of suitable blocks, to deformation with given characteristics: for preference, the said central section is moved axially by an amount W measuring 5 mm, while at the same time causing it to depart from the radial orientation by an angle α of 15°, and the annular wheel-trim reverts to its initial shape, because it has not undergone permanent deformation. Note that, for preference, an annular wheel-trim according to the invention does not have very high elastic deformation properties because it is beneficial for the annular wheel-trim to leave its housing or become broken or display visible permanent deformation if the rolling assembly has experienced a very significant impact, which could be damaging to it, so that this impact can be detected visually. Thus, for preference, the annular wheel-trim experiences permanent deformation or breakage if subjected to a deformation by axial movement of the said central section by an amount W greater than 10 mm while at the same time causing it to depart from the radial orientation by an angle α greater than 35°.

The invention lends itself to numerous variations; it opens the way to a new design for the use of floating-rim wheels; among the possible and beneficial variations let us mention the possibility of incorporating into the annular wheel-trim according to the invention an indicator that an impact has been suffered that is above and beyond a certain threshold, which will, for example, result in visible permanent deformation of part of the wheel-trim or in local breakage or loss thereof, or alternatively, deliberately, that the annular wheel-trim will no longer remain fitted, the example of FIG. 5 lending itself particularly well to such an effect.

A person skilled in the art will easily be able to adopt design measures that will facilitate mounting or make the mounting more robust, such as the addition of a metal profile of suitable shape moulded into or bonded to the flange, or alternatively adopt alternative forms of shape for the elements that form male/female connections, such as studs or other circumferentially discontinuous shapes in place of or to supplement the slots and protrusions described herein. As regards the choice of material, plastics materials are suitable; of course, the material of the extender on which it is mounted needs to be taken into consideration; the sizing will preferably be such that the annular wheel-trim will be rather slightly under tension once fitted.

The invention claimed is:

1. An annular wheel-trim for a wheel that has a floating tire seat, the wheel having an axis of rotation, the wheel comprising a rim which comprises rim lateral parts, each rim lateral part comprising a tire seat extended axially outwards by a flange, at least one of the tire seats being a floating seat and the flange axially extending the floating seat being a floating flange, having a shape of revolution generated by a central section comprising a portion of substantially radial mean orientation, the annular wheel-trim comprising fixing elements able to provide removable attachment to the flange,
    wherein the annular wheel-trim has a capacity for elastic deformation that allows it, when subjected, over an arc with a curvilinear length of 430 mm, to deform, moving the central section axially by 2 mm, while at the same time causing it to depart from the radial orientation by an angle α of 5° and revert to its initial shape without permanent deformation.

2. The annular wheel-trim according to claim 1, wherein the fixing elements collaborate with an axially exterior wall of the flange.

3. The annular wheel-trim according to claim 1, wherein the fixing elements collaborate with a radially exterior wall of the flange.

4. The annular wheel-trim according to claim 1, wherein a connection between the annular wheel-trim and the flange is provided by surfaces with an axial undercut.

5. The annular wheel-trim according to claim 1, wherein one of the annular wheel-trim and the flange comprises at least one circumferential groove and the other of the annular wheel-trim and the flange comprises at least one circumferential protrusion,
    wherein the at least one circumferential groove and the at least one circumferential protrusion is formed on an axially interior face of the annular wheel-trim or an axially exterior face of the flange, and wherein the at least one circumferential groove or the at least one circumferential protrusion form complementary dovetails, when viewed in meridian section, so that they collaborate with one another to provide removable mounting of the annular wheel-trim on the flange.

6. The annular wheel-trim according to claim 1, wherein the annular wheel-trim further comprises radially exterior and interior faces, each face being inclined axially outwards, and wherein the flange further comprises radially exterior and interior faces, each face being inclined axially inwards, so as to collaborate in order to allow removable mounting of the annular wheel-trim on the flange.

7. The annular wheel-trim according to claim 1, wherein, viewed in meridian section, the annular wheel-trim has a C-shape, comprising an axially-oriented radially exterior branch and comprising an axially-oriented radially interior branch, the radially exterior branch comprising a rib acting as a radially inwards protrusion, the radially interior branch comprising a rib acting as a radially outwards protrusion, and wherein the flange comprises a slot formed on its radially exterior surface and a slot formed on its radially interior surface, the slots and ribs collaborating with one another to provide removable mounting of the annular wheel-trim on the flange.

8. The annular wheel-trim according to claim 1, wherein the annular wheel-trim experiences permanent deformation or breakage if subjected to a deformation by axial movement of the central section by an amount W greater than 10 mm while at the same time causing it to depart from the radial orientation by an angle $\alpha$ greater than 35°.

9. An assembly comprising:

an annular wheel-trim, for a wheel that has a floating tire seat; and an extender for the wheel, the wheel having an axis of rotation, the wheel comprising a rim which comprises rim lateral parts, each rim lateral part comprising a tire seat extended axially outwards by a flange, at least one rim lateral part being formed by the extender comprising a floating seat axially extended by a floating flange, the annular wheel-trim having a shape of revolution generated by a central section comprising a portion of substantially radial mean orientation, and the annular wheel-trim comprising fixing elements able to provide removable attachment to the flange, wherein the annular wheel-trim has a capacity for elastic deformation that allows it, when subjected, over an arc with a curvilinear length of 430 mm, to deform, moving the central section axially by 2 mm, while at the same time causing it to depart from the radial orientation by an angle $\alpha$ of 5° and revert to its initial shape without permanent deformation.

\* \* \* \* \*